United States Patent
Yoshida et al.

(10) Patent No.: US 7,107,847 B2
(45) Date of Patent: Sep. 19, 2006

(54) SEMICONDUCTOR ACCELERATION SENSOR AND METHOD OF MANUFACTURING THE SAME

(75) Inventors: Hitoshi Yoshida, Osaka (JP); Kazushi Kataoka, Neyagawa (JP); Hisakazu Miyajima, Osaka (JP); Sumio Akai, Otsu (JP); Daisuke Wakabayashi, Shijonawate (JP); Koji Goto, Hirakata (JP); Makoto Morii, Daito (JP)

(73) Assignee: Matsushita Electric Works, Ltd., Osaka (JP)

( * ) Notice: Subject to any disclaimer, the term of this patent is extended or adjusted under 35 U.S.C. 154(b) by 120 days.

(21) Appl. No.: 10/867,701

(22) Filed: Jun. 16, 2004

(65) Prior Publication Data

US 2004/0261529 A1    Dec. 30, 2004

(30) Foreign Application Priority Data

Jun. 25, 2003  (JP)  ............... 2003-181192
Oct. 6, 2003   (JP)  ............... 2003-347220

(51) Int. Cl.
*G01P 15/12* (2006.01)

(52) U.S. Cl. ................ 73/514.33; 73/514.38
(58) Field of Classification Search ............ 73/514.33, 73/514.38, 514.14
See application file for complete search history.

(56) References Cited

U.S. PATENT DOCUMENTS

| | | | |
|---|---|---|---|
| 5,060,504 A | 10/1991 | White et al. | |
| 5,121,633 A | 6/1992 | Murakami et al. | |
| 5,134,881 A | 8/1992 | Henrion et al. | |
| 5,313,836 A | 5/1994 | Fujii et al. | |
| 6,772,632 B1 * | 8/2004 | Okada | ............ 73/514.38 |
| 6,805,008 B1 * | 10/2004 | Selvakumar et al. | ..... 73/504.14 |

FOREIGN PATENT DOCUMENTS

EP    0899574    3/1999

(Continued)

OTHER PUBLICATIONS

English Language Abstract of JP 8-327656.

(Continued)

*Primary Examiner*—John E. Chapman
(74) *Attorney, Agent, or Firm*—Greenblum & Bernstein, P.L.C.

(57) ABSTRACT

A semiconductor acceleration sensor comprises: a frame having an opening inside thereof; flexible beams extending from the frame to the inside of the opening of the frame; a weight suspended from and supported by the beams so that the weight can freely move; piezoresistors to be mounted on the beams and to vary the resistance values in response to accelerations which work on the piezoresistors. The frame comprises damper plate portions, each of which covers a part of the opening spanning from a corner portion of two neighboring sides of the frame on the side of the opening to the inside of the opening, and each of which serves serve as a stopper to limit movement of the weight. The weight has corner portions which face the corner portions, respectively, and each of which is chamfered to have a shape of arc or a polygonal line consisting of at least three sides as seen in plan view. Thereby, the breaking strength of each stopper is increased, and hence a semiconductor acceleration sensor having superior shock resistance can be obtained.

11 Claims, 13 Drawing Sheets

FOREIGN PATENT DOCUMENTS

| | | |
|---|---|---|
| EP | 1298442 | 4/2003 |
| JP | 8-327656 | 12/1996 |
| JP | 9-82984 | 3/1997 |
| JP | 11-135804 | 5/1999 |
| JP | 2000-502442 | 2/2000 |
| JP | 2002-257845 | 9/2002 |
| JP | 2003-329702 | 11/2003 |
| WO | 95/26509 | 10/1995 |
| WO | 97-22011 | 6/1997 |
| WO | 03/023414 | 3/2003 |

OTHER PUBLICATIONS

English Language Abstract of JP 9-82984.
English Language Abstract of JP 11-135804.
English Language Abstract of JP 2000-502442.
English Language Abstract of JP 2002-257845.
English Language Abstract of JP 2003-329702.

* cited by examiner

A-A

B-B

SEMICONDUCTOR ACCELERATION SENSOR AND METHOD OF MANUFACTURING THE SAME

BACKGROUND OF THE INVENTION

1. Field of the Invention

The present invention relates to a semiconductor acceleration sensor with shock resistance, and a method of manufacturing the same.

2. Description of the Related Art

A conventional semiconductor acceleration sensor is shown in FIG. 15A and FIG. 15B. This sensor has: a frame 101 having an opening inside thereof; flexible beams 102 extending from the frame 101 to the inside of the opening of the frame 101 and having an intersection portion; a weight 103 suspended from and supported by the intersection portion of the beams 102 so that the weight can freely move; piezoresistors (not shown) which are mounted on the beams 102 and which vary the resistance values with distortions generated in the beams 102 due to displacement of the weight; and a seating 105. (Refer to e.g. Japanese Laid-open Patent Publication Hei 8-327656 and Japanese Laid-open Patent Publication Hei 11-135804.)

The frame 101 is formed of e.g. a semiconductor substrate made of silicon, and has a roughly rectangular shape, as seen in plan view, with an opening 106 inside thereof. The beams 102 are provided each to extend inward from an upper surface of each of the four sides constituting the frame 101, and intersect with each other at around the center of the inside of the frame 101 to form an intersection portion 102a. Each of the beams 102 is formed to be thin so as to be flexible.

Plural piezoresistors (not shown) are provided on the surfaces of the beams 102, and are respectively provided in the vicinity of the intersection portion 102a and at four base end portions 102b of the beams 102. Assume here that a direction being parallel to any arbitrary one of the sides of the frame 101 is X-axis, that a direction being parallel to another side of the frame 101 and intersecting the X-axis at an angle of 90 degrees is Y-axis, and that a direction intersecting each of the X-axis and the Y-axis at an angle of 90 degrees is Z-axis. Under this assumption, three sets each of four piezoresistors corresponding to the X-axis, the Y-axis and the Z-axis form three Wheatstone bridges to detect accelerations working in the directions of the three axes, respectively. These piezoresistors are further connected to electrodes (not shown) formed on the frame 101.

The weight 103 is connected to and suspended from a lower surface of the intersection portion 102a of the beams 102, whereby the weight 103 is supported by the frame 101 so as to be freely movable owing to the flexibility of the beams 102. The weight 103 has a cross section of trapezoidal shape having a width decreasing in the direction of the Z-axis from the frame 101 to the seating 105. Furthermore, the weight 103 has a thickness smaller than that of the frame 101 in order to provide a space for the weight 103 to be able to freely move in response to acceleration working thereon. At corner portions of the opening 106 of the frame 101, stoppers 104 are provided to limit the displacement of the weight 103. Each stopper 104 has a rough shape of triangle, two sides of which are supported by and along the corresponding sides of the frame 101. The stoppers 104 and the seating 105 have functions to limit amount of free movement of the weight 103. As seen in plan view, the seating 105 has a shape of rectangle roughly the same as the outer shape of the frame 101.

When acceleration works on the semiconductor acceleration sensor having the above-described configuration, the weight 103 moves back-and-forth longitudinally, laterally and/or vertically according to the direction and magnitude of the acceleration working thereon, because the weight 103 is supported by the frame 101 and the beams 102 so as to be freely movable. At this time, deflections occur in the beams 102 so that plural ones of the piezoresistors are subjected to stresses, whereby their resistances vary. As a result, the Wheatstone bridges lose the equilibrium, whereby electrical signals corresponding to the acceleration working thereon are output from the Wheatstone bridges corresponding to the respective axes. By taking the electrical signals from the electrodes, the acceleration can be detected. When excessive acceleration works on the beams 102, the stoppers 104 and the seating 105 limit the free movement of the weight 103, thereby preventing them from being broken.

However, according to such semiconductor acceleration sensor, there is a possibility that shocks may be locally concentrated when the weight 103 impacts the stopper(s) 104. Because of its influence, it has been difficult to improve the stoppers 104 with respect to resistance to breaking.

SUMMARY OF THE INVENTION

An object of the present invention is to provide a semiconductor acceleration sensor with excellent shock resistance by improving the breaking limit of the stoppers.

For achieving the object, a semiconductor acceleration sensor according to the present invention is formed of a semiconductor substrate and comprises: a rectangular frame having sides and an opening inside thereof, and further having corner portions each being of each two neighboring sides of the frame; plural flexible beams extending from the frame to the inside of the opening of the frame, and having an intersection portion at an intersection therebetween; a weight being suspended from and supported by the intersection portion of the beams, and being positioned in the opening as seen in plan view so as to be freely movable, and having corner portions facing the corner portions of the frame, respectively; and piezoresistors being mounted on the beams and varying the resistance values with distortions generated in the beams due to displacement of the weight, wherein the frame comprises damper plate portions provided at the corner portions of the frame, respectively; for limiting displacements of the corner portions of the weight, respectively, beyond a predetermined amount, wherein each of the damper plate portions covers a part of the opening, which part spans from each of the corner portions of the frame to the inside of the opening, and wherein each of the corner portions of the weight is chamfered to have a shape of arc or a polygonal line consisting of at least three sides as seen in plan view.

According to the present invention, due to the damper plate portions functioning as stoppers, the displacement of the weight toward the beams can be so limited, without need to additionally provide stoppers formed of separate members, that the weight does not move beyond the acceleration detection limit to cause its breaking. Furthermore, each of the corner portions of the weight, which respectively correspond to the corner portions of the frame, is chamfered to form a circular arc or a polygonal line consisting of at least three sides as seen in plan view. Owing to this design, when the weight impacts the damper plate portion(s), shocks given by the weight to the damper plate portion(s) can be prevented from being locally concentrated. Thus, the breaking strength of the damper plate portions, and hence the shock resistance of the semiconductor acceleration sensor, can be increased.

Preferably, each of the damper plate portions has through-holes penetrating therethrough in the thickness direction thereof. This is advantageous in the case where a substrate or layer to be initially interposed between the weight and the damper plate portions is to be etched, because thereby the substrate or layer can be increased in its area to be exposed to an etchant, and thus the etching time can be shortened.

Further preferably, an edge of each of the damper plate portions, which edge faces the opening of the frame, is contiguously connected, at each end thereof, by an arc-shaped intersection portion to an end of each of two edges of the frame, which are neighboring the edge of the each of the damper plate portions and which face the opening of the frame. This makes it possible to disperse stress to be otherwise concentrated on the intersection portion between each damper plate portion and the frame. Thus, the breaking strength of the damper plate portions, and hence the shock resistance of the semiconductor acceleration sensor, can be increased.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 1A is a schematic plan view of a semiconductor acceleration sensor according to Embodiment 1 of the present invention, while

FIG. 7A is a schematic plan view of a semiconductor acceleration sensor according to Embodiment 4 of the present invention, while

FIG. 8A is a schematic plan view of a semiconductor acceleration sensor according to Embodiment 5 of the present invention, while

FIG. 15A is a schematic oblique view of a conventional semiconductor acceleration sensor, while

DESCRIPTION OF THE PREFERRED EMBODIMENTS

Semiconductor acceleration sensors according to embodiments of the present invention will be described in the following non-limiting Embodiments with reference to the drawings.

Embodiment 1

Figure 1A:
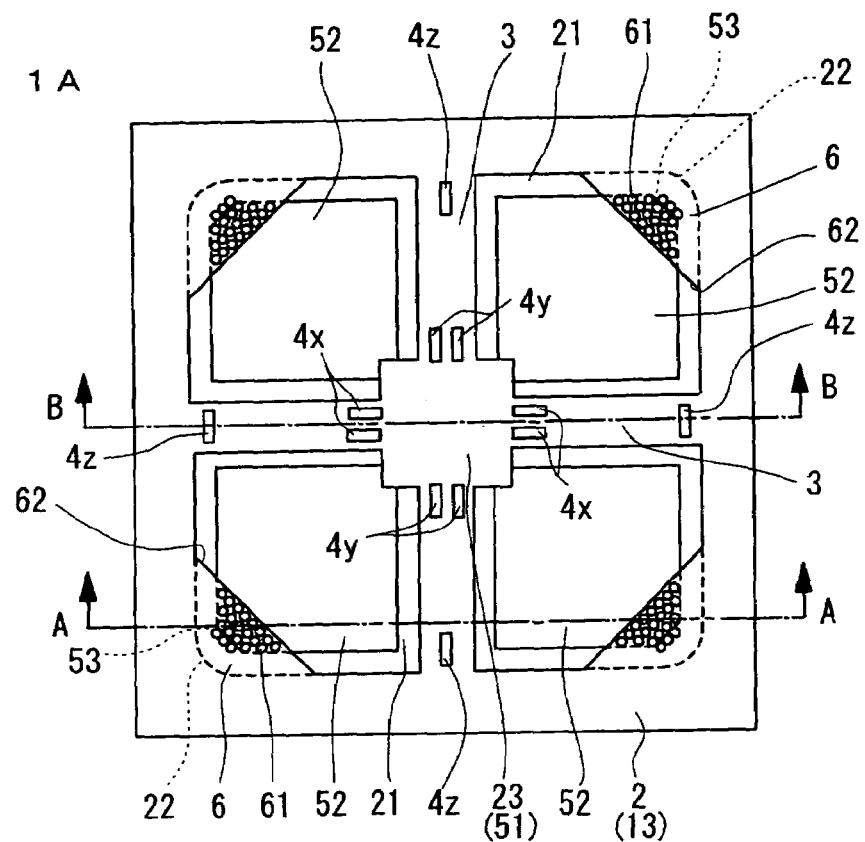
Figure 1B:
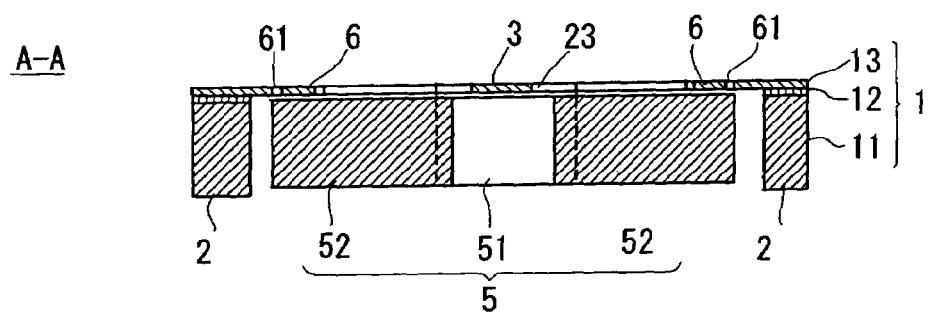
FIG. 1B is a schematic cross-sectional view of FIG. 1A along A—A line.
Figure 1C:
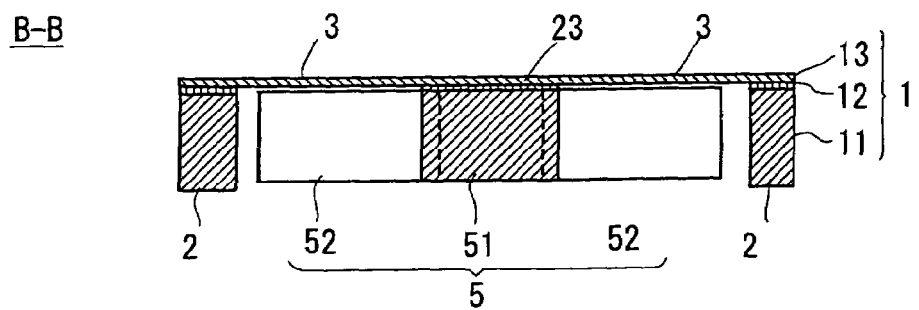
FIG. 1C is a schematic cross-sectional view of FIG. 1A along B—B line.
Figure 2:
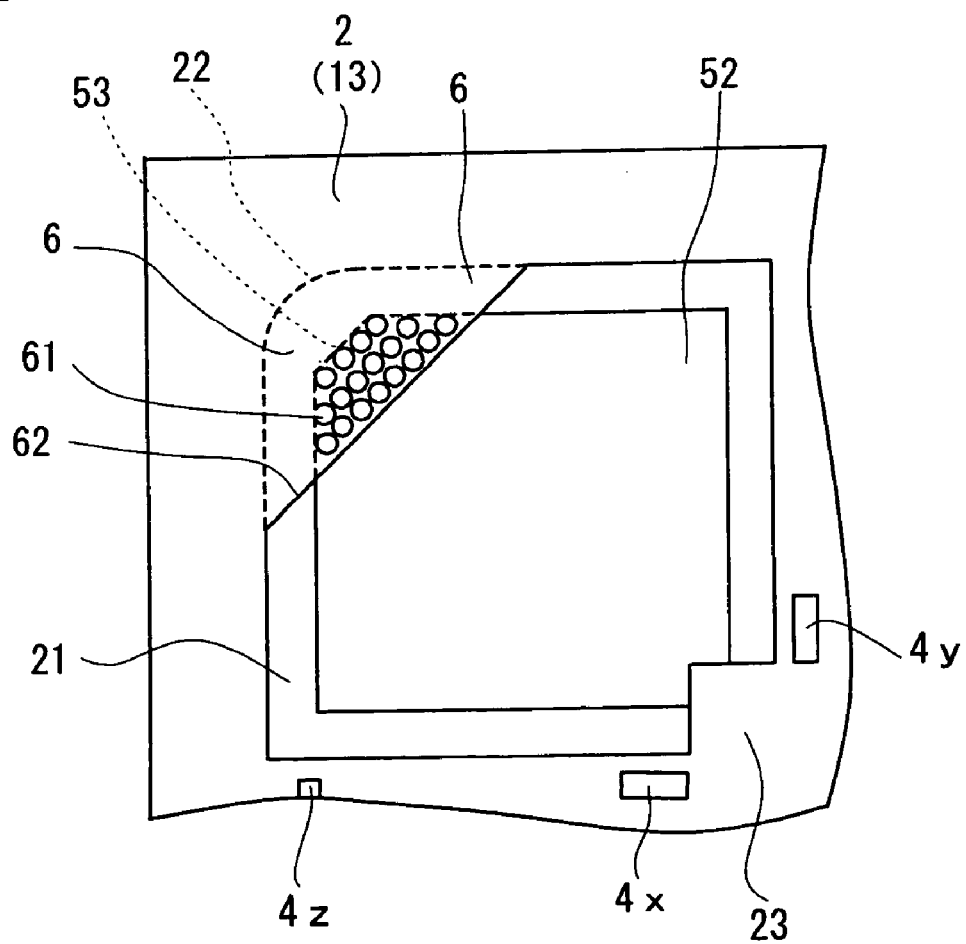
FIG. 2 is a schematic enlarged plan view, partially perspective, of the semiconductor acceleration sensor, showing a part thereof including and around a damper plate portion.
Figure 3A:
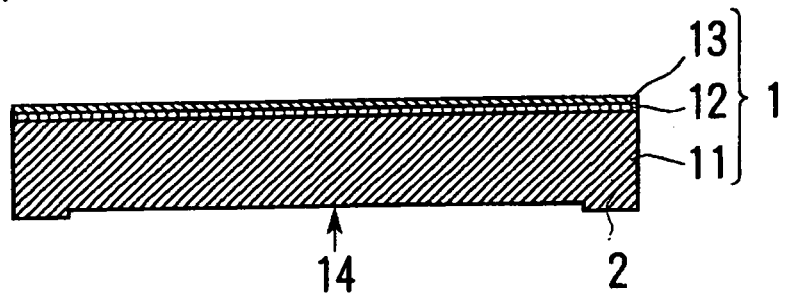
FIG. 3A to FIG. 3D are schematic cross-sectional views of the semiconductor acceleration sensor and its precursors at different steps, respectively, showing a method of manufacturing the same.
Figure 3B:
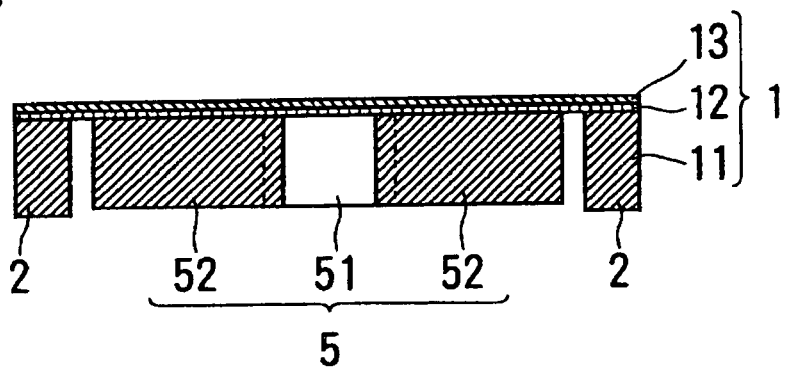
Figure 3C:
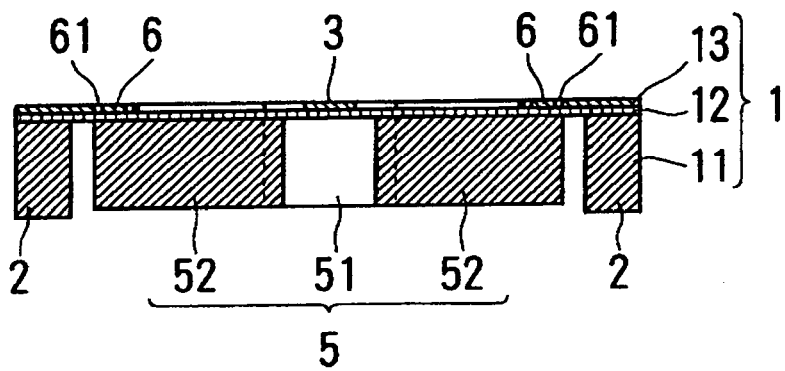
Figure 3D:
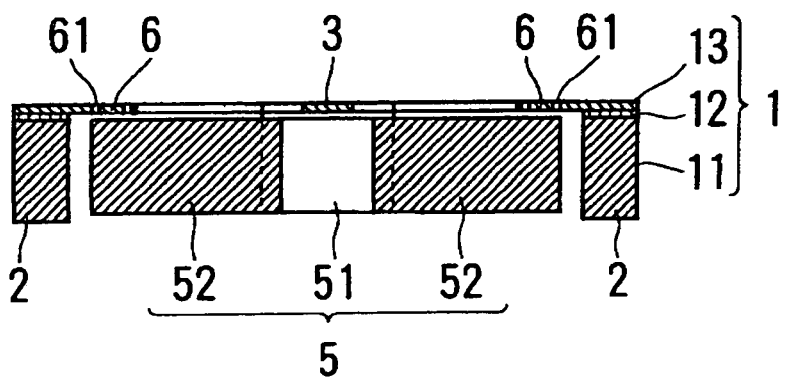

A semiconductor acceleration sensor according to Embodiment 1 of the present invention will be described with reference to FIG. 1A, FIG. 1B and FIG. 1C as well as FIG. 2. A semiconductor acceleration sensor of the present Embodiment is made by processing an SOI (silicon-on-insulator) substrate 1 comprising a stack of a support layer 12 made of e.g. silicon (Si), an insulating layer 12 made of e.g. silicon dioxide ($SiO_2$) on the support layer, and an active layer 13 made of silicon (Si) on the insulating layer. This active layer 13 is a semiconductor layer. The semiconductor acceleration sensor comprises, as main constituent elements, a frame 2, beams 3, piezoresistors 4, a weight 5 and damper plate portions 6.

The frame 2 serves as a base of the semiconductor acceleration sensor, and supports the weight 5, in a space inside thereof, via the beams 3 that are flexible. The frame 2 is formed by providing an inner opening to the SOI substrate 1 to form a frame body, and has a roughly rectangular shape as seen in plan view. Thus, the frame 2 comprises the three layers consisting of the support layer 11, the insulating layer 12 and the active layer 13. Electrodes (not shown) made of e.g. aluminum (Al) and respectively connected to piezoresistors $4x$, $4y$ and $4z$ are formed on the surface of the support layer 11. From the electrodes, accelerations converted to electrical signals can be taken. Each corner portion 22 of each two neighboring sides of the frame 2 on the side of each opening 21 has e.g. an arc shape as seen in plan view.

The beams 3 are each formed by the active layer only, and suspend and support the weight 5 so that the weight can freely move. It is to be noted herein that the term "freely move" is used to mean "move back-and-forth longitudinally, laterally and/or vertically". The beams 3 each extend inward from approximately a center of each side of the frame 2, and are coupled to each other at approximately the center of the frame 2 via an intersection portion 23. Each beam 3 has a strip shape as seen in plan view, having a thickness approximately the same as that of the active layer 13, and is a flexible member to be able to deflect according to magnitude of acceleration which works thereon via the weight 5. Four openings 21 are formed by the beams 3 and the frame 2.

When the beams 3 are deformed due to acceleration working thereon, the piezoresistors 4x, 4y and 4z convert stresses generated therein to electrical signals, respectively. These piezoresistors 4x, 4y and 4z are formed on the surfaces of the beams 3 in the vicinity of borders between the beams 3 and the intersection portion 23 as well as borders between the beams 3 and the frame 2. Among them, the piezoresistors 4x and 4y in the vicinity of the borders between the beams 3 and the intersection portion 23 respond to accelerations having vector components in directions parallel to sides of the frame 2. Defining that a direction being parallel to one of the sides of the frame 2 is X-axis, and that a direction being parallel to another side of the frame 2 and perpendicular to the X-axis is Y-axis, then four piezoresistors 4x, which are provided on the beams 3 parallel to the X-axis, form a Wheatstone bridge, while four piezoresistors 4y, which are provided on the beams 3 parallel to the Y-axis, form another Wheatstone bridge. On the other hand, the piezoresistors 4z in the vicinity of borders between the beams 3 and the frame 2 respond to accelerations having vector components in a direction perpendicular to both X-axis and Y-axis. Defining this direction as Z-axis, the four piezoresistors 4z provided on the four beams 3 form a further Wheatstone bridge.

The weight 5 freely moves according to magnitude of each acceleration working thereon, and varies deflection amount of each beam 3 accordingly. In other words, the acceleration applied to the weight 5 is converted to a force calculated from Newton's equation of motion (F=m α where F is force, m is mass of the weight 5, and α a is acceleration), and this force deflects the beam 3. The weight 5 is positioned in the space inside the frame 2, and is suspended from and supported by the beams 3. More specifically, the weight 5 is formed by the support layer 11, and comprises a main weight 51 and four auxiliary weights 52.

The main weight 51 has a roughly rectangular shape as seen in plan view, and has a thickness smaller than the thickness of the frame 2 by an amount of allowable displacement of each beam 3 in the Z-axis. The main weight 51 is connected to the intersection portion 23 via the insulating layer 12 of the SOI substrate 1. Each of the auxiliary weights 52 has a roughly rectangular shape as seen in plan view, and has a thickness similar to that of the main weight 51 formed by the support layer 11. The auxiliary weights 52 are connected to four corners of the main weight 51, respectively, and are positioned inside the four openings 21, respectively, as seen from the side of the active layer 13 at the time of no acceleration working thereon. Each of corner portions 53 of the auxiliary weights 52, which faces each of the corner portions 22 of the frame 2, is chamfered, and has a shape of arc (arc as seen in plan view) similar to the each corner 22. Each corner portion 53 is formed to have such a curvature that the distance between the frame 2 and the each auxiliary weight 52 is kept substantially constant.

Each of the damper plate portions 6 is a stopper to limit excessive displacement of the weight 5 in the direction of the Z-axis by the contact thereof with the auxiliary weight 52, and is formed to cover a part of the opening 21 spanning from the corner portion 22 of the two neighboring sides of the frame 2 on the side of the opening 21 to inside of the opening 21. Each damper plate portion 6 has a roughly triangular shape as seen in plan view, and is formed by the active layer 13 of the SOI substrate 1 such that the damper plate portion 6 is on the same plane as each beam 3.

Each of the damper plate portions 6 has a plurality of through-holes 61 penetrating therethrough in the thickness direction thereof that are provided in an area thereof facing the auxiliary weight 52. Each of the through-holes 61 has a roughly circular shape as seen in plan view. These through-holes 61 are mainly used as paths to introduce an etchant for separating the weight 5 from the damper plate portions 6 in a manufacturing process, and are placed roughly equidistantly from one another, namely that any two neighboring through-holes 61 have a roughly constant center-to-center distance. Furthermore, such through-holes as being closest to an edge 62 of each of the damper plate portions 6, which edge neighbors the opening 21, are placed at a distance of roughly half the center-to-center distance of the through-holes 61 from the edge 62.

In the following, a process of manufacturing a semiconductor acceleration sensor according to the present Embodiment will be described with reference to FIG. 3A to FIG. 3D. These drawings are schematic cross-sectional views of the semiconductor acceleration sensor of FIG. 1 or precursors thereof cut along A—A line in FIG. 1A, which respectively show steps of the manufacturing process. To begin with, an SOI substrate 1 is prepared having a 400 to 600 µm thick support layer 11, a 0.3 to 1.5 µm thick insulating layer 12 and a 4 to 6 µm thick active layer 13, wherein the conductivity type of the support layer 11 is n-type. On the surface of the SOI substrate 1, an oxide film (not shown) of silicon dioxide ($SiO_2$) is formed e.g. by pyrogenic oxidation. The insulating layer 12 has an etching rate different from that of each of the support layer 11 and the active layer 13. This is advantageous for performing the later described etching to etch away the support layer 11 or the active layer 13, leaving the insulating layer 12.

Next, the oxide film on the support layer 11 is patterned into a predetermined shape by removing a central portion of the oxide film, the central portion being roughly rectangular as seen in plan view. Thereafter, the thus exposed support layer 11 is subjected to etching by wet etching using e.g. an alkaline aqueous solution such as aqueous solution of potassium hydroxide (KOH) or aqueous solution of tetramethylammonium hydroxide (TMAH), or by dry etching using e.g. reactive ion etching (RIE), so as to form a recess 14 in the support layer 11 (refer to FIG. 3A).

Subsequently, piezoresistors 4, electrodes and wirings (not shown) to electrically connect the piezoresistors to the electrodes are formed on the active layer 13. Among them, the piezoresistors 4 and the wirings are formed as follows. The oxide film on the active layer 13 is patterned in a predetermined shape. Into the thus exposed active layer 13, impurities with p-type conductivity such as boron (B) are injected by e.g. ion injection or deposition diffusion. Thereafter, the impurities are thermally diffused thereinto in a mixed gas of steam and oxygen heated to about 1100° C. for about 30 minutes, thereby forming a further oxide film on the surface on the active layer side of the SOI substrate, including on the piezoresistors and the wirings, whereby the process of forming the piezoresistors and the wirings ends.

On the other hand, the electrodes are formed as follows. After the piezoresistors 4 and the wirings are formed as above, contact holes (not shown) are formed at predetermined positions on the further oxide film on the wirings. Subsequently, e.g. an aluminum film is deposited on the oxide film on the active layer 13 side by sputtering. Thereafter, a photoresist (not shown) is coated on the aluminum film, and is then patterned in a predetermined shape, thereby ending the process of forming the electrodes.

Next, a photoresist is coated on the support layer 11, and is then patterned to remove portions of the photoresist in its area corresponding to a peripheral portion of the bottom surface of the recess 14 and in its areas corresponding to four roughly long rectangular areas of the bottom surface of the recess 14, each of which spans toward inside (roughly the center) of the bottom surface of the recess 14 from a roughly central position of each of the four sides of the bottom surface of the recess 14. Thereafter, by inductively coupled plasma (ICP) etching, the support layer 11 is etched away from its surface on the recess 14, at the portions thereof exposed by removing the photoresist, up to its end at the border thereof with the insulating layer 12 (refer to FIG. 3B).

Then, a photoresist is coated on the active layer 13, and is patterned in a predetermined shape to remove portions of the photoresist corresponding to the resultant openings 21 and through-holes 61. Thereafter, by the above-described wet etching or inductively coupled plasma (ICP) etching, the active layer 13 is etched away from its surface, exposed by removing the photoresist, up to its end at the border thereof with the insulating layer 12 (refer to FIG. 3C).

Finally, portions of the insulating layer 12, which correspond to those other than the resultant frame 2 and main weight 51, are etched away by being immersed in a hydrofluoric acid (HF) solution or by being exposed to a sprayed mist of a hydrofluoric acid (HF) solution, thereby forming the weight 5 to be freely movable; and completing the semiconductor acceleration sensor.

The semiconductor acceleration sensor can be put to use as an acceleration sensor equipment by mounting the sensor in a package (not shown), or more specifically by mounting the sensor in a package with a seating placed between the sensor and the package, and connecting the package to the electrodes of the sensor with electrical wiring.

In the semiconductor acceleration sensor according to the present Embodiment, each damper plate portion 6 allows the auxiliary weight 52 to contact thereto when the semiconductor acceleration sensor receives acceleration beyond an allowable limit of acceleration in the Z-axis, thereby preventing the beams 3 from being displaced beyond the allowable limit. Furthermore, the arc shapes formed on the corner portion 22 of the frame 2 and on the corner portion 53 of each auxiliary weight 52 function to disperse shocks generated when the auxiliary weight 52 is impacted on the damper plate portion 6, thereby preventing the shocks from being locally concentrated.

The through-holes 61 function to allow the insulating layer 12 interposed between the resultant damper plate portions 6 and auxiliary weights 52 to increase its area to contact the etchant. Furthermore, the through-holes 61 are placed such that neighboring through-holes 61 have a roughly constant center-to-center distance, whereby respective neighboring points of contact between the etchant and the insulating layer 12 are roughly equidistant from one another.

According to the semiconductor acceleration sensor as described above, displacement of the weight 5 in the direction of the Z-axis can be limited, and local concentration of shocks to be applied to a damper plate portion 6 can be reduced when the weight 5 is impacted on the damper plate portion 6. Accordingly, the breaking strength of the damper plate portions 6, and hence the shock resistance of the semiconductor acceleration sensor, can be increased.

Besides, according to the method of manufacturing the semiconductor acceleration sensor as described above, the time for etching the insulating layer 12 can be shortened. Furthermore, the portion of the insulating layer 12 interposed between the resultant frame 2 and main weight 51 can be prevented from being overetched, thereby increasing stiffness of the semiconductor acceleration sensor.

It is to be noted that the shapes of each corner portion 22 of the frame 2 and the corner portion 53 of each auxiliary weight 52 are not limited to arc as seen in plan view. For example, each two neighboring sides of the frame 2 as well as the two neighboring outer sides of each auxiliary weight 52 can be cut by a vertical plane intersecting each side of the each two sides at an angle of 45 degrees (forming a polygonal line consisting of three sides as seen in plan view), or can be cut by plural vertical planes to form roughly arc shape at each corner portion of each such two neighboring sides thereof. Furthermore, it is also possible that only either each corner portion 22 of the frame 2 or the corner portion 53 of each auxiliary weight 52 can be formed to have a shape of plural sides or arc as seen in plan view.

It is also to be noted that it is possible to form the through-holes 61 in the entire area of each damper-plate portion 6, not limiting to the area of each damper plate portion 6 which area faces each corresponding auxiliary weight 52. In addition, the shape of each through-hole 61 as seen in plan view is not limited to circle or roughly circle. It is furthermore possible without forming through-holes 61 to remove the insulating layer 12 interposed between each resultant damper plate portion 6 and auxiliary weight 52.

Embodiment 2

Figure 4:
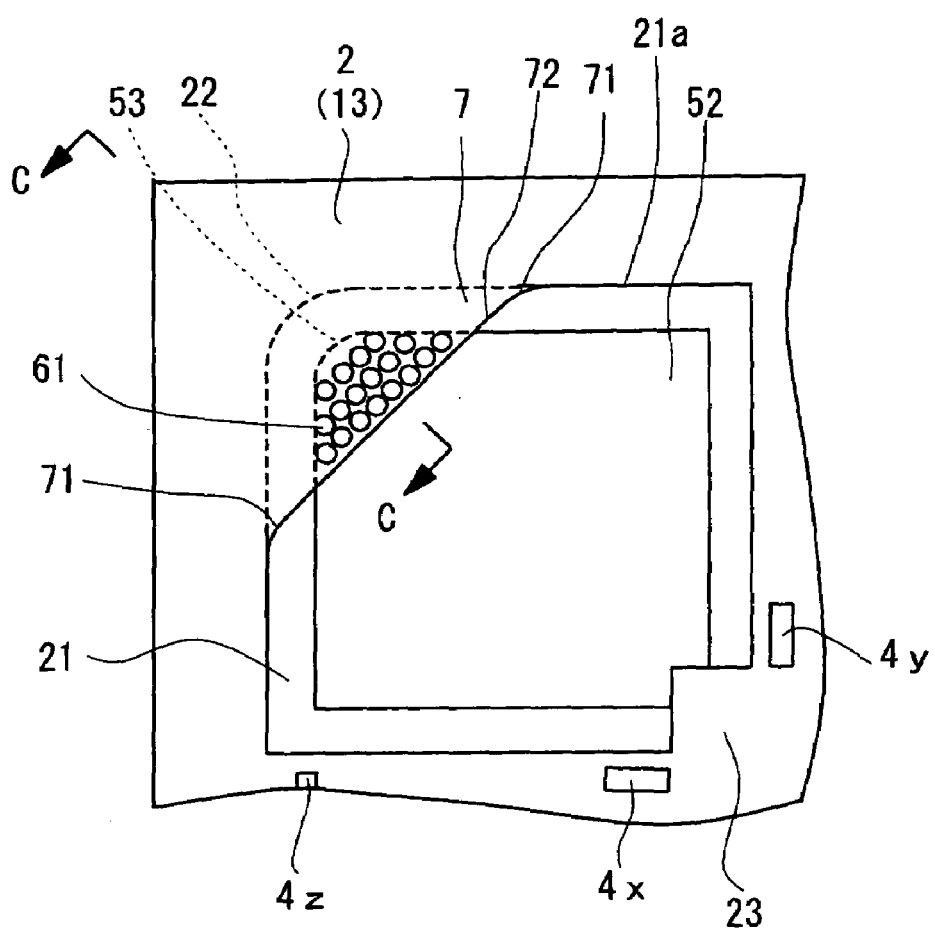
FIG. 4 is a schematic enlarged plan view, partially perspective, of a semiconductor acceleration sensor according to Embodiment 2 of the present invention, showing a part thereof including and around a damper plate portion.
Figure 5:
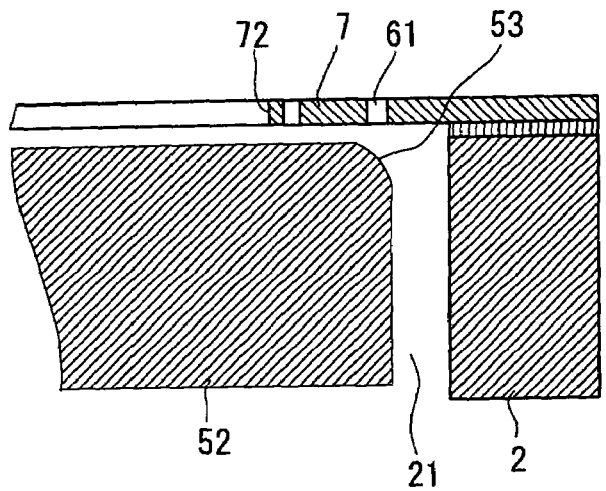
FIG. 5 is a schematic cross-sectional view of FIG. 4 along C—C line.

FIG. 4 and FIG. 5 show a part of a semiconductor acceleration sensor according to Embodiment 2 of the present invention, including and around a damper plate portion 7. Except that each damper plate portion 7 of the semiconductor acceleration sensor according to the present Embodiment is different from the damper plate portion 6 in Embodiment 1, elements of the semiconductor acceleration sensor according to the present Embodiment other than the damper plate portion 7 are substantially the same as those according to Embodiment 1. Accordingly, like reference numerals are used here to refer to like elements in Embodiment 1, and their detailed description is omitted here.

The damper plate portion 7 of the present Embodiment is different from the damper plate portion 6 of Embodiment 1 in that an edge 72 of the damper plate portion 7, which edge 72 faces the opening 21 of the frame 2, is contiguously connected, at each end thereof by an arc-shaped intersection portion 71 (arc in plan view), to an end of each of two edges 21a of the frame 2, which are neighboring the edge 72 of the damper plate portion 7 and which face the opening 21 of the frame 2. The damper plate portion 7 allows the auxiliary weight 52 to contact thereto when the semiconductor acceleration sensor receives acceleration beyond an allowable limit of acceleration in the Z-axis, thereby preventing the beams 3 from being displaced beyond the allowable limit. Furthermore, the arc shape of the intersection portion 71 makes it possible to disperse stress to be otherwise concentrated on the intersection portion 71.

According to the present Embodiment, the corner portion 53 of the auxiliary weight 52 is chamfered, and has a shape of arc as seen in side view as well. This structure makes it possible that when the auxiliary weight 52 is significantly displaced to be stopped at the corner portion 53 thereof by the damper plate portion 7, the auxiliary weight 52 and the damper plate portion 7 make larger area contact therebetween, whereby the damper plate portion 7 is subjected to weaker shocks.

According to the semiconductor acceleration sensor of the present Embodiment, the breaking strength of the damper plate portion 7, and hence the shock resistance of the semiconductor acceleration sensor, can be further increased. It is to be noted that the intersection portion 71 is not limited to arc, but can be a line segment (as seen in plan view) on a vertical plane intersecting the edge 72 and the frame 2 at both ends of the line segment at an angle of 45 degrees, respectively. It is also possible that the intersection portion 71 can be a roughly arc comprising a polygonal line (as seen in plan view) having plural sides on plural vertical planes, respectively.

Embodiment 3

Figure 6:
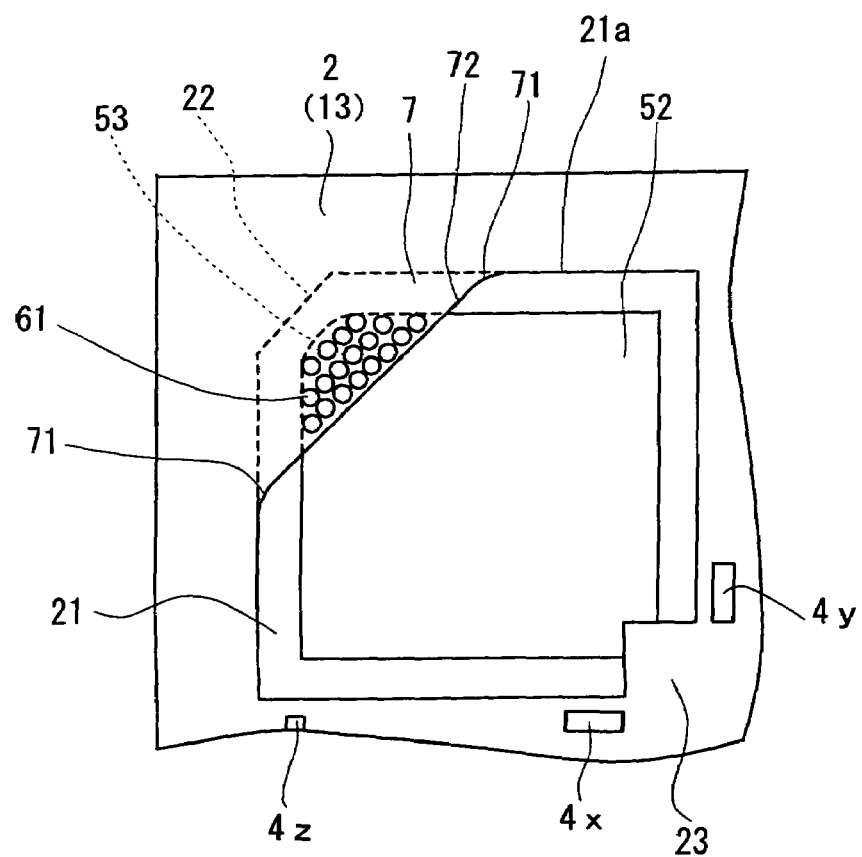
FIG. 6 is a schematic enlarged plan view, partially perspective, of a semiconductor acceleration sensor according to Embodiment 3 of the present invention, showing a part thereof including and around a damper plate portion.

FIG. 6 shows a part of a semiconductor acceleration sensor according to Embodiment 3 of the present invention, including and around a damper plate portion 7. The present Embodiment is different from Embodiment 2 as shown in FIG. 4 in that the corner portion 22 of the frame 2 according to the present Embodiment is formed to have plural sides (more specifically three sides) as seen in plan view, whereas the corner portion 22 in Embodiment 2 has a curved surface, which is arc as seen in plan view. The present Embodiment is similar to Embodiment 2 as shown in FIG. 4 in that the corner portion 53 of the auxiliary weight 52 has an arc shape.

Embodiment 4

Figure 7A:
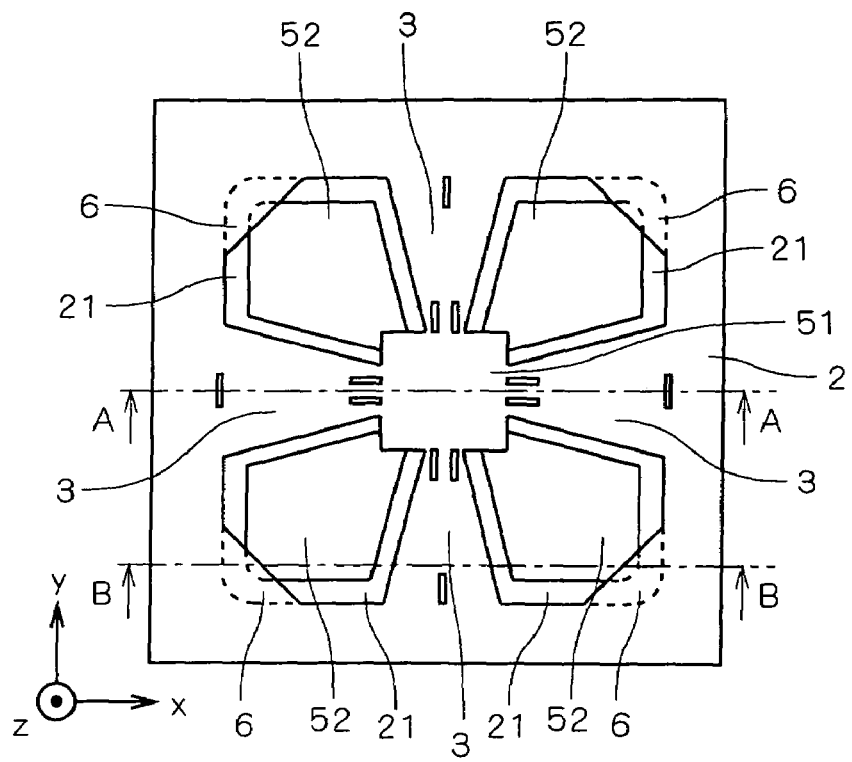
Figure 7B:
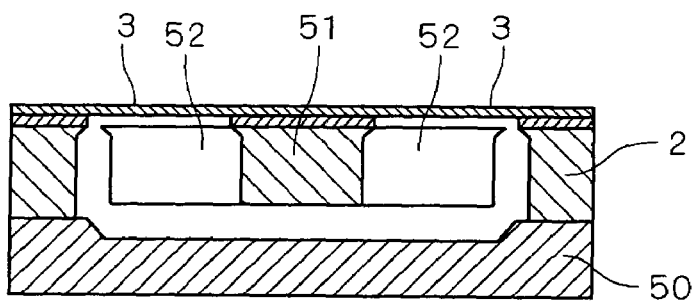
FIG. 7B is a schematic cross-sectional view of FIG. 7A along A—A line.
Figure 7C:
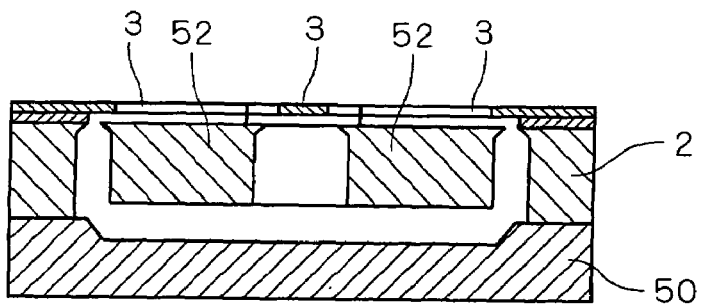
FIG. 7C is a schematic cross-sectional view of FIG. 7A along B—B line.

FIG. 7A, FIG. 7B and FIG. 7C show a semiconductor acceleration sensor of the present Embodiment. According to the present Embodiment, each of the beams 3, as a flexible member, has a width which gradually increases from the main weight 51 to the corresponding side of the frame 2. More specifically, each beam 3 has a shape such that the each beam 3 increases its width, at its end at the frame 2 side, as the position of such width of the each beam 3 goes from the main weight 51 and becomes closer to the corresponding side of the frame 2. As shown in the drawings, each of the auxiliary weights 52 as seen in plan view has a shape roughly similar to the shape of each one of the corresponding openings 21 as seen in plan view. Such shape of each auxiliary weight 52 and such shape of each opening 21 are different from corresponding those illustrated in Embodiment 1 above, respectively, whereas the other structures in the two Embodiments are similar to each other. More specifically, in the present Embodiment 4 as well, e.g. each frame 2 has a damper plate portion 6, and the corner portion of each auxiliary weight 52 is chamfered. The shape of the damper plate portion 6 and the shape of the corner portion of the auxiliary weight 52 are not limited to such as shown in the drawings, but they can have arbitrary shapes. (This arbitrariness of the shapes also applies to the following embodiments.)

The frame 2 is bonded, at its bottom surface of all around the rectangular periphery thereof, to an inner surface of all around a rectangular periphery of a cover 50 having a rectangular shape as seen in plan view. This cover provision also applies to the above-described Embodiments. The cover 50 has, on the side thereof facing the weight 5, a recess formed therein to secure movement range of the weight 5.

According to the present Embodiment, the stiffness of each beam 3 at side of the frame 2 can be increased, namely that the spring constant thereof can be increased. As a result, the displacement of the weight 5 attributed to thermal stress transferred from the frame 2 to each beam 3 can be decreased, thereby improving the temperature characteristics of the sensor, particularly the temperature characteristics of output of a bridge circuit consisting of resistors each placed in the vicinity of an end of each beam 3 at the frame 2 side. Moreover, performance variation with time as well as occurrence of hysteresis characteristics can be reduced.

It is to be noted that each beam 3 can also have a shape such that the each beam 3 increases both its width and thickness from the main weight 51 side thereof to the frame 2 side thereof. Thereby, the stiffness of each beam 3 at the frame 2 side can be further increased. Further, each beam 3 can have a cross-section of a trapezoidal shape on a plane perpendicular to length direction thereof. This can increase the stiffness of each beam 3 at the front side as compared to that at the back side, thus decreasing the deflection of the beam 3 attributed to thermal stress. Alternatively, each beam 3 can have such cross-section, on a plane perpendicular to length direction thereof, that has a concave arc shape at each of both sides thereof. This can provide increased area of side faces of each beam 3, thus decreasing the deflection of the beam 3 attributed to thermal stress. Further, each beam 3 can have a thickness increasing in length direction thereof from approximate center thereof to both ends thereof.

Embodiment 5

Figure 8A:
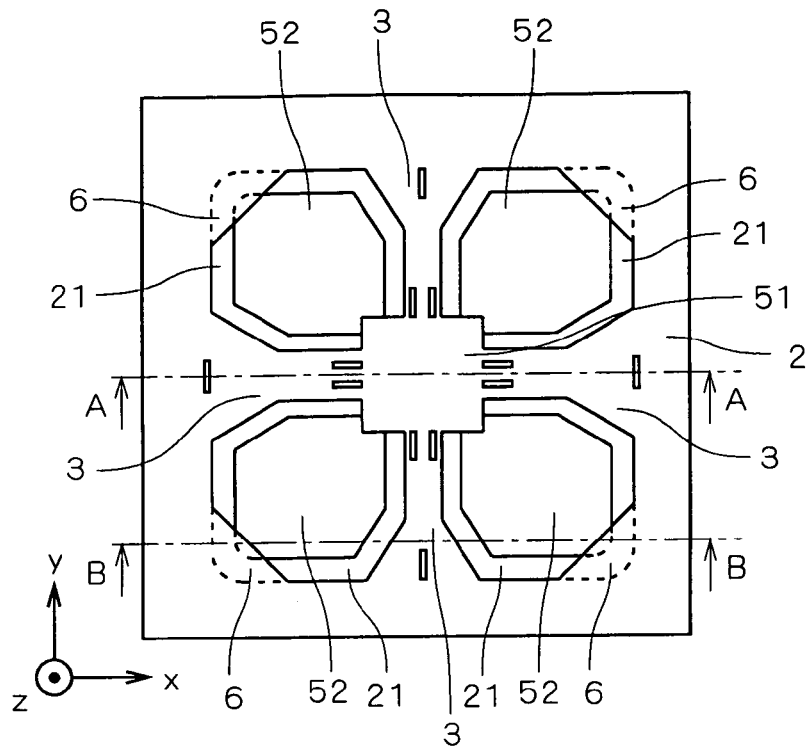
Figure 8B:
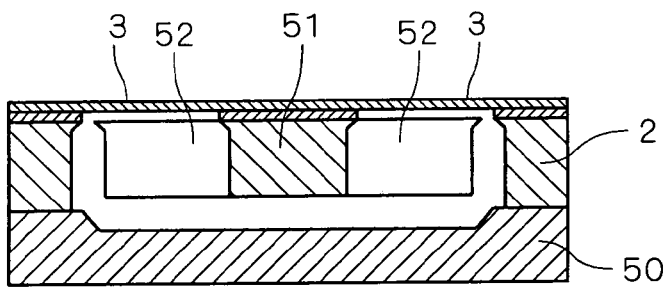
FIG. 8B is a schematic cross-sectional view of FIG. 8A along A—A line.
Figure 8C:
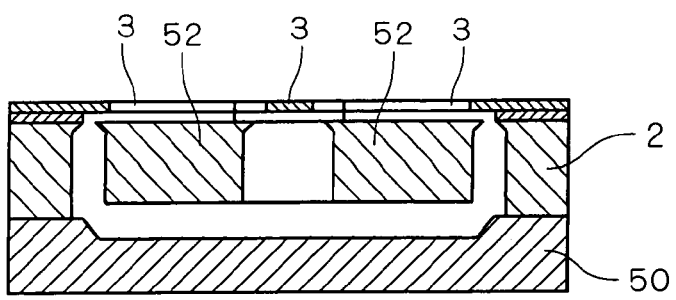
FIG. 8C is a schematic cross-sectional view of FIG. 8A along B—B line.

FIG. 8A, FIG. 8B and FIG. 8C show a semiconductor acceleration sensor according to the present Embodiment. The present Embodiment is different from Embodiment 4 in the shape of each beam 3. Each beam 3 is shaped such that, as seen in plan view, each beam 3 has a constant width from its end at the main weight 51 to its approximate center in the length direction, and a width gradually increasing from the approximate center in the length direction to its end at the corresponding side of the frame 2.

The present Embodiment makes it possible to reduce the width of each beam 3 in the vicinity of the main weight 51 as compared with that in Embodiment 4, thereby increasing sensitivity of acceleration detection in each direction of the X-axis and the Y-axis.

Embodiment 6

Figure 9:
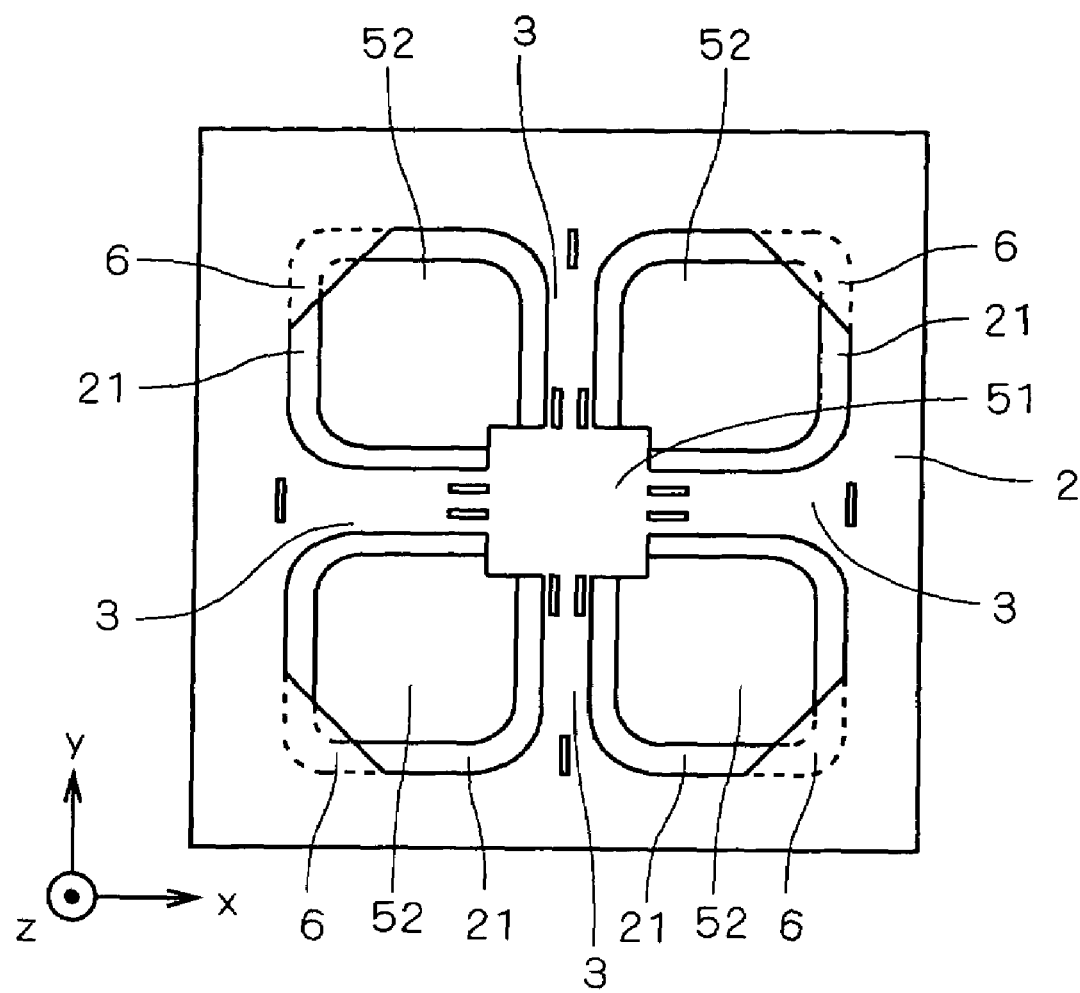
FIG. 9 is a schematic plan view of a semiconductor acceleration sensor according to Embodiment 6 of the present invention.

FIG. 9 shows a semiconductor acceleration sensor according to the present Embodiment. In the present Embodiment, each beam 3 is shaped such that, as seen in plan view, each beam 3 has a constant width from its end at the main weight 51 to its further position in the length direction near its end at the corresponding side of the frame 2, and a width gradually increasing from the further position in the length direction to its end at the corresponding side of the frame 2.

The present Embodiment also makes it possible to reduce the width of each beam 3 in the vicinity of the main weight 51, thereby increasing sensitivity of acceleration detection in each direction of the X-axis and the Y-axis. In addition, since each beam 3 at its end portion at the corresponding side of the frame 2 is formed to have an arc shape as seen in plan view, it is possible to mitigate stress concentration at the end portion of the each beam 3 at the frame 2 side when excessive acceleration is applied to the each beam 3, thereby increasing the shock resistance.

It is possible that in addition to the arc shape as seen in plan view to increase the width toward the frame 2 side, each beam 3 can have a curve or arc shape as seen in side view to increase the thickness toward the frame 2 side. It is also possible that each beam 3 has only either the arc shape as seen in plan view or the arc shape in side view. It is preferable that each beam 3 has both of such arc shapes in order to enable further increased shock resistance.

Embodiment 7

Figure 10:
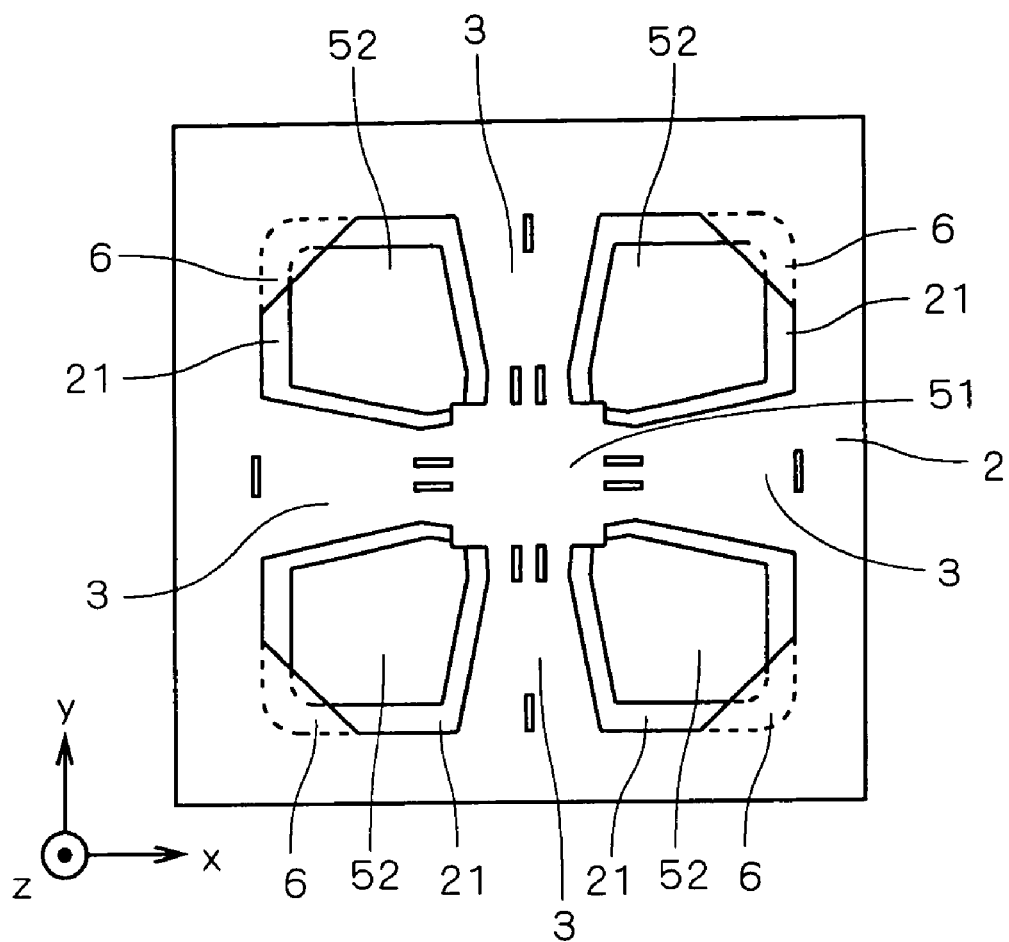
FIG. 10 is a schematic plan view of a semiconductor acceleration sensor according to Embodiment 7 of the present invention.

FIG. 10 shows a semiconductor acceleration sensor according to the present Embodiment. In the present Embodiment, each beam 3 has a width, as seen in plan view, decreasing in the length direction from its end at the frame 2 side to an inner position near its end at the main weight 51 side, but then increasing in the length direction from such inner position to its end at the main weight 51 side. This expanded width of the each beam 3 at its inner end at the main weight 51 side makes it possible to stabilize temperature characteristics of the output values of the bridge circuits for detecting accelerations in the directions of the X-axis and the Y-axis, respectively.

Embodiment 8

Figure 11:
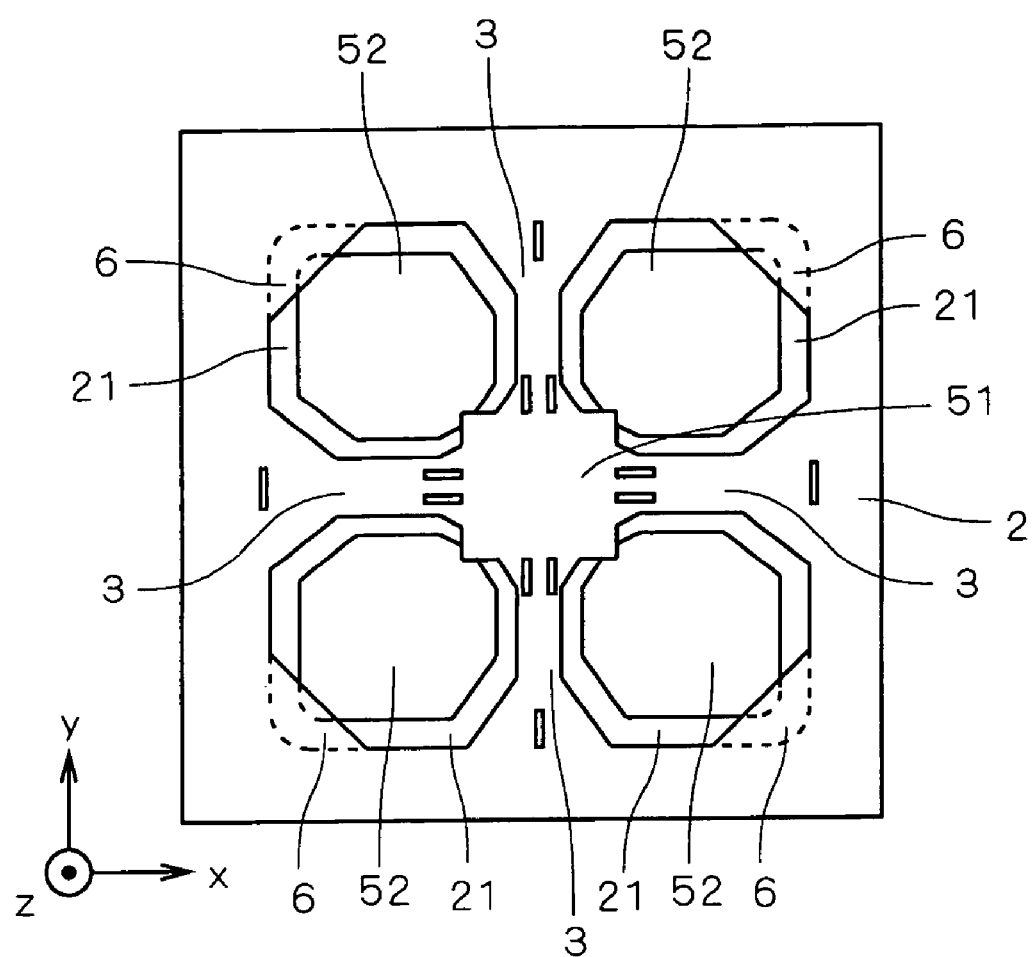
FIG. 11 is a schematic plan view of a semiconductor acceleration sensor according to Embodiment 8 of the present invention.

FIG. 11 shows a semiconductor acceleration sensor according to the present Embodiment. In the present Embodiment, each beam 3 is formed to have a width, as seen in plan view, decreasing in the length direction from its end at the frame 2 side to a first inner position, but then staying constant in the length direction from such first inner position to a second inner position near its end at the main weight 51 side, and then gradually increasing in the length direction from such second inner position to its end at the main weight 51 side. This expanded width of the each beam 3 at its inner end at the main weight 51 side makes it possible to obtain effects similar to those described above in Embodiment 7.

Embodiment 9

Figure 12:
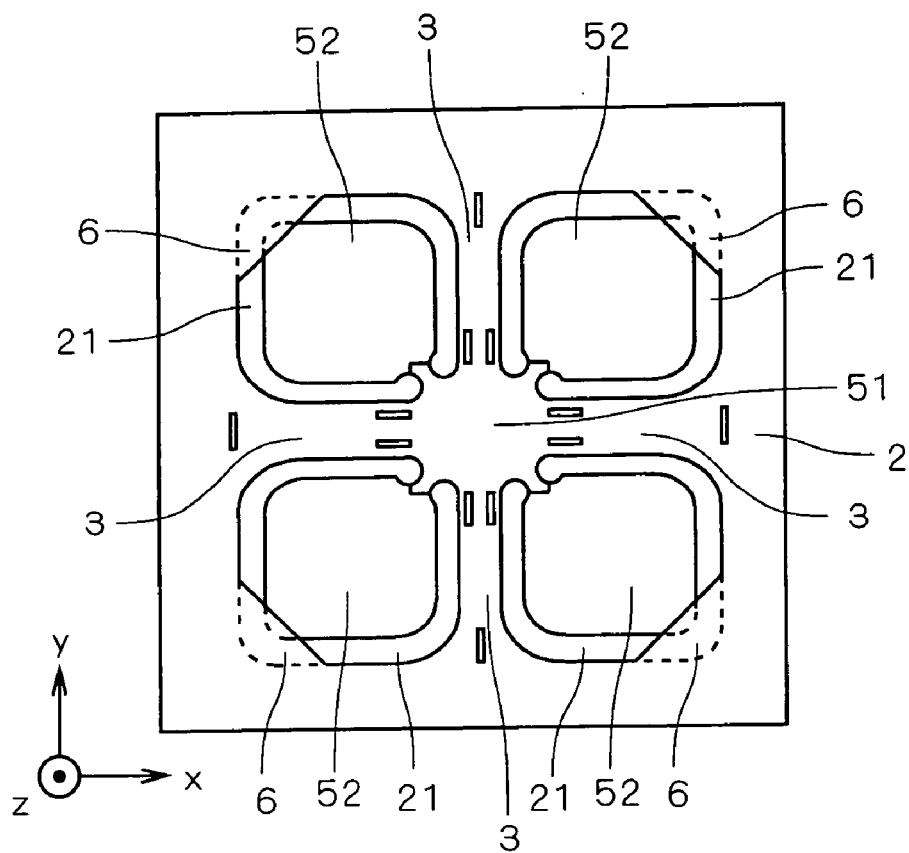
FIG. 12 is a schematic plan view of a semiconductor acceleration sensor according to Embodiment 9 of the present invention.

FIG. 12 shows a semiconductor acceleration sensor according to the present Embodiment. In the present Embodiment, each beam 3 is formed to have a width, as seen in plan view, gradually decreasing inwardly in the length direction from its end at the frame 2 side. This feature is common to certain other Embodiments. This feature makes it possible to obtain effects similar to those described above in Embodiments. Besides, as shown in FIG. 12, it is also possible that each beam 3 has, at its inner portion at the weight 51, a shape different from each of the corresponding shapes in the other Embodiments.

Embodiment 10

Figure 13:
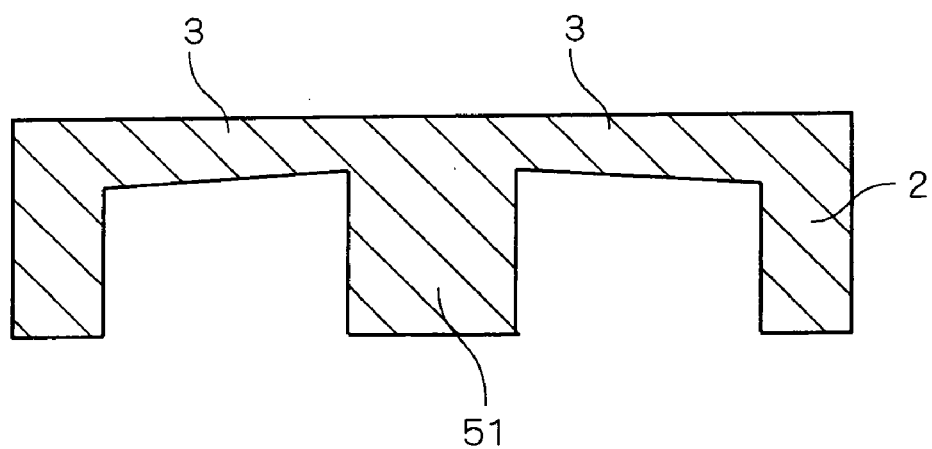
FIG. 13 is a schematic cross-sectional view of a part of a frame-beam structure including beams and a main weight for a semiconductor acceleration sensor according to Embodiment 10 of the present invention.

FIG. 13 shows a frame-beam structure for a semiconductor acceleration sensor according to the present Embodiment. The frame-beam structure of the present Embodiment is substantially the same, in its basis design, as the frame-beam structure in each of the above-described Embodiments, except that here each beam 3 has a thickness increasing from its end at the main weight 51 side to its end at the frame 2 side. In the present Embodiment, a silicon substrate is used to manufacture the frame-beam structure for the semiconductor acceleration sensor. This structure according to the present Embodiment makes it possible to reduce displacement of the main frame 51 attributed to thermal stress to be transferred from the frame 2 to each beam 3, thereby improving the temperature characteristics.

In the following, a method of manufacturing a frame-beam structure including beams 3 for a semiconductor acceleration sensor according to the present Embodiment will be described with reference to FIG. 14A to FIG. 14G.

Figure 14A:
FIG. 14A to FIG. 14G are schematic cross-sectional views of the frame-beam structure and its precursors at different steps, respectively, showing a method of manufacturing the same.
Figure 14B:
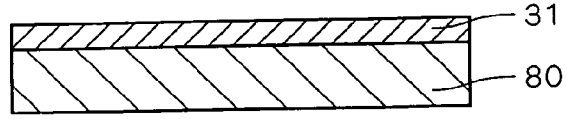
Figure 14C:
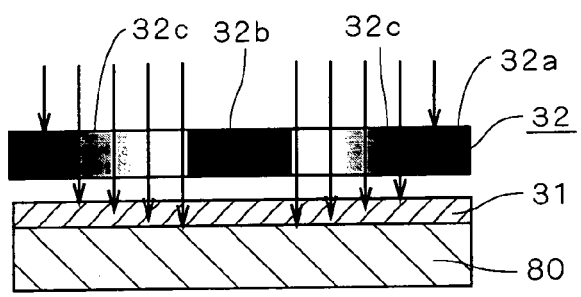

To begin with, a positive photoresist is coated on a rear surface (upper surface in the drawings) of a silicon substrate 80 as shown in FIG. 14A to form a photoresist layer 31, thereby obtaining a photoresist-coated substrate as shown in FIG. 14B. After such step, the photoresist layer 31 is exposed, using an exposure photomask as shown in FIG. 14C. The photomask 32 has, formed therein, a light shielding area 32a (hereafter referred to as first light shielding area 32a) positioned in correspondence with the frame 2, a light shielding area 32b (hereafter referred to as second light shielding area 32b) positioned in correspondence with the main weight 51, and a light transmitting area 32c positioned in correspondence with each beam 3. Herein, the light transmitting area 32c has such light transmittance distribution that the light transmittance gradually varies and increases from its end at the first light shielding area 32a side to its end at the second light shielding area 32b side. (In short, the light transmitting area 32 is a graded type light transmitting area.) It is to be noted here that the arrows in FIG. 14C schematically indicate light from an exposure light source, and the tip of each arrow head indicates arrival point of the light.

Figure 14D:
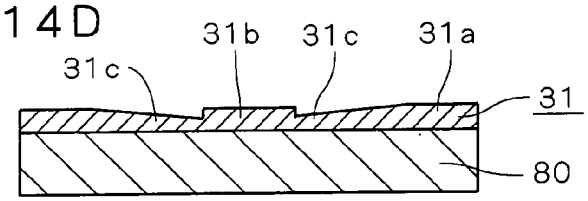

After the step of exposing the photoresist layer 31 using the photomask 32, the photoresist layer 31 is developed and patterned, thereby obtaining a substrate with the patterned photoresist layer 31 as shown in FIG. 14D. This patterned photoresist layer 31 constitutes a mask layer on the rear surface of the silicon substrate 80, wherein the mask layer comprises: a first protective mask part 31a being positioned in correspondence with the frame 2 and having a uniform thickness; a second protective mask part 31b being positioned in correspondence with the main weight 51 and having a uniform thickness; and a slope transfer mask part 31c being positioned in correspondence with each beam 3 and having a thickness gradually increasing from the second protective mask part 31b side to the first protective mask 31a side.

Figure 14E:

After the above-described step of forming the mask layer, the slope transfer mask part 31c of the photoresist layer 31 is dry etched on the rear surface (upper surface in the drawing) of the silicon substrate 80, using e.g. an inductively coupled plasma etching equipment, until the slope transfer mask part 31c is removed. Thereafter, the remaining mask layer of photoresist layer is removed, thereby obtaining a substrate as shown in FIG. 14E. Thus, this step of dry etching can be referred to as a transfer step.

Figure 14F:
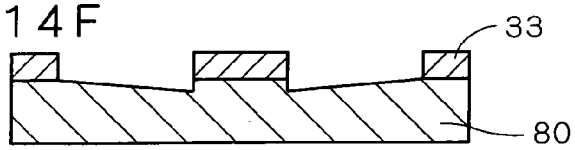
Figure 14G:
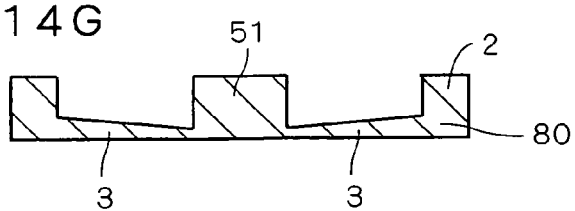
Figure 15A:
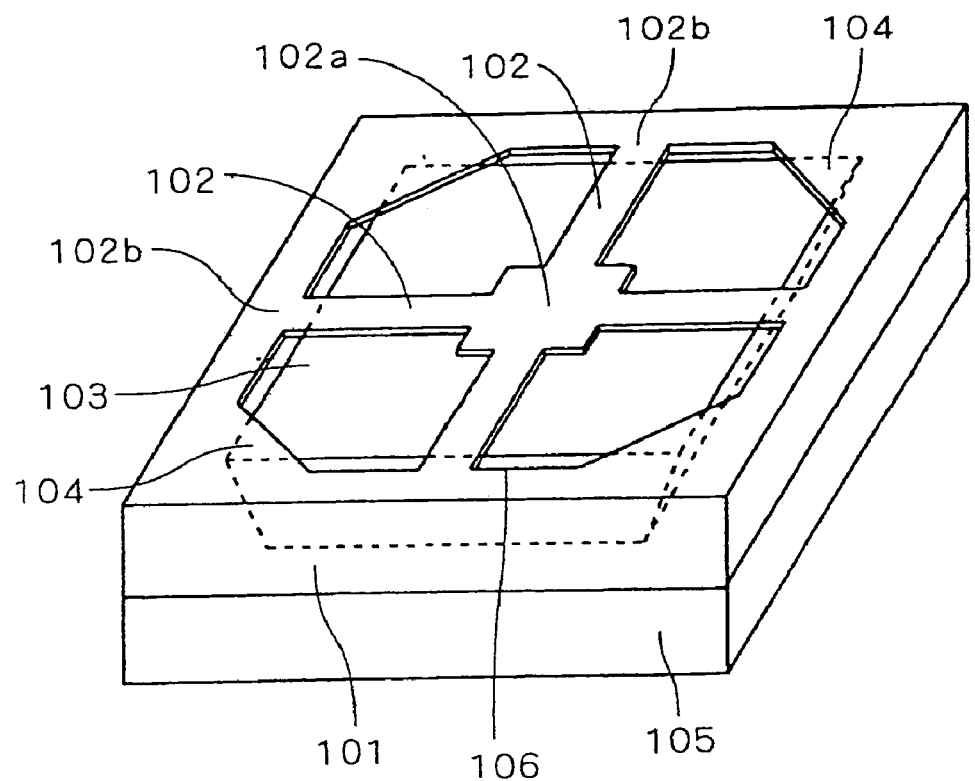
Figure 15B:
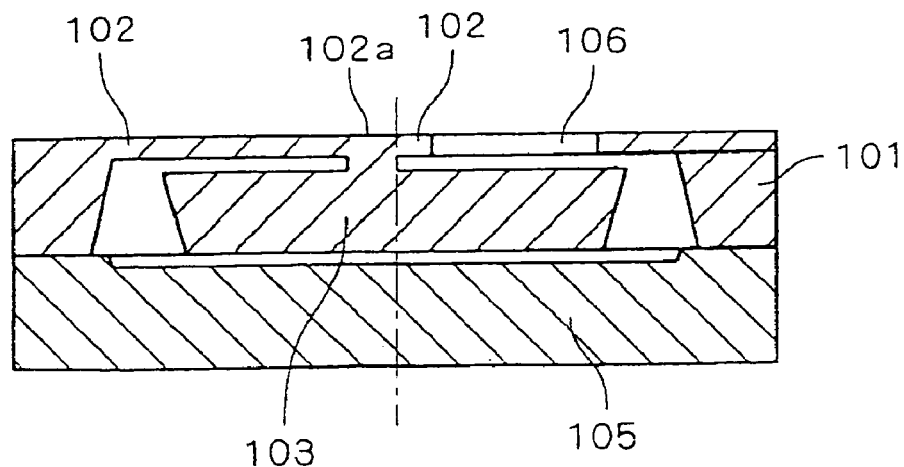
FIG. 15B is a schematic cross-sectional view of the same.

Next, a patterned photoresist layer 33 is formed on the substrate as shown in FIG. 14E to obtain a substrate as shown in FIG. 14F. Subsequently, the substrate 80 is subjected to a rear surface patterning step in a manner that the substrate 80 is dry etched on its rear surface (upper surface in the drawing) to leave portions thereof corresponding to the main weight 51 and the frame 2, and to have a desired thickness at each portion thereof corresponding to each beam 3. Thereafter, the photoresist layer 33 is removed to form a frame-beam structure including each beam 3 as shown in FIG. 14G, in which each beam 3 has a thickness gradually increasing from its end at the main weight 51 side to its end at the frame 2 side.

It is to be noted here that the semiconductor acceleration sensors as illustrated in the above-described Embodiments are three axis sensors capable of detecting accelerations in the directions of the X-axis, the Y-axis the Z-axis. However, the technical concept of the present invention can be applied to two axis or one axis semiconductor acceleration sensors.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A semiconductor acceleration sensor formed of a semiconductor substrate, and comprising:
    a rectangular frame having sides and an opening inside thereof, and further having corner portions each being of each two neighboring sides of the frame;
    plural flexible beams extending from the frame to the inside of the opening of the frame, and having an intersection portion at an intersection therebetween;
    a weight being suspended from and supported by the intersection portion of the beams, and being positioned in the opening as seen in plan view so as to be freely movable, and having corner portions facing the corner portions of the frame, respectively; and
    piezoresistors being mounted on the beams and varying the resistance values with distortions generated in the beams due to displacement of the weight,
    wherein the frame comprises damper plate portions provided at the corner portions of the frame, respectively, for limiting displacements of the corner portions of the weight, respectively, beyond a predetermined amount,
    wherein each of the damper plate portions covers a part of the opening, which part spans from each of the corner portions of the frame to the inside of the opening, and
    wherein each of the corner portions of the weight is chamfered to have a shape of arc or a polygonal line consisting of at least three sides as seen in plan view.

2. The semiconductor acceleration sensor according to claim 1, wherein each of the corner portions of the frame each being of the each two neighboring sides of the frame has a shape of polygonal line consisting of at least three sides as seen in plan view.

3. The semiconductor acceleration sensor according to claim 1, wherein each of the damper plate portions has through-holes penetrating therethrough in the thickness direction thereof.

4. The semiconductor acceleration sensor according to claim 1, wherein an edge of each of the damper plate portions, which edge faces the opening of the frame, is contiguously connected, at each end thereof by an arc-shaped intersection portion, to an end of each of two edges of the frame, which are neighboring the edge of the each of the damper plate portions and which face the opening of the frame.

5. The semiconductor acceleration sensor according to claim 1, wherein each of the beams increases at least one of width and thickness thereof, at an end thereof at the frame side, as positions of the width and the thickness, respectively, become closer to the frame.

6. The semiconductor acceleration sensor according to claim 5, wherein each of the beams increases at least one of width and thickness thereof from approximate center thereof in length direction thereof to an end thereof at the frame side.

7. The semiconductor acceleration sensor according to claim 6, wherein each of the beams has, at a portion from approximate center thereof in length direction thereof to an end thereof at the frame side, at least one of an arc shape as seen in plan view to increase the width thereof toward the frame side and an arc shape as seen in side view to increase the thickness thereof toward the frame side.

8. The semiconductor acceleration sensor according to claim 5, wherein each of the beams has, at an end portion at the frame side, an arc shape either as seen in plan view to increase the width thereof toward the frame side or as seen in side view to increase the thickness thereof toward the frame side.

9. The semiconductor acceleration sensor according to claim 1, wherein each of the beams increases at least one of width and thickness thereof, at an end thereof at the weight side, as positions of the width and the thickness, respectively, become closer to the weight.

10. The semiconductor acceleration sensor according to claim 9, wherein each of the beams has, at an end portion thereof at the weight side, at least one of: an arc shape at each of both sides of the width thereof as seen in plan view to increase the width thereof toward the weight side; and an arc shape as seen in side view to increase the thickness thereof toward the weight side.

11. The semiconductor acceleration sensor according to claim 1, wherein each of the beams has a thickness increasing from an end thereof at the weight side to an end thereof at the frame side thereof.

* * * * *